United States Patent
Talend et al.

[19]

[11] Patent Number: 5,885,100
[45] Date of Patent: Mar. 23, 1999

[54] ELECTRICAL CONNECTOR WITH LIGHT TRANSMISSION MEANS

[75] Inventors: Donald R. Talend, Wauconda; Randy Joe Kempf, Naperville; James T. Roberts, Oak Park; Charles T. Walsh, Elgin, all of Ill.

[73] Assignee: Molex Incorporated, Lisle, Ill.

[21] Appl. No.: 854,610

[22] Filed: May 12, 1997

[51] Int. Cl.⁶ .................................................. H01R 13/00
[52] U.S. Cl. .......................................... 439/490; 439/607
[58] Field of Search ..................................... 439/488, 489, 439/490, 607, 610, 676

[56] References Cited

U.S. PATENT DOCUMENTS

| | | | |
|---|---|---|---|
| 4,626,633 | 12/1986 | Ruehl et al. ............................. | 379/27 |
| 4,978,317 | 12/1990 | Pocrass ................................... | 439/490 |
| 5,222,164 | 6/1993 | Bass, Sr. et al. ...................... | 439/490 |
| 5,378,172 | 1/1995 | Roberts .................................. | 439/607 |
| 5,496,195 | 3/1996 | Reed ...................................... | 439/607 |
| 5,613,873 | 3/1997 | Bell, Jr. ................................. | 439/490 |

FOREIGN PATENT DOCUMENTS

| | | | |
|---|---|---|---|
| 0740370A1 | 10/1996 | European Pat. Off. ...... | H01R 13/717 |
| 740370 A1 | 10/1996 | European Pat. Off. ............... | 439/490 |

*Primary Examiner*—Hien Vu
*Attorney, Agent, or Firm*—A. A. Tirva

[57] ABSTRACT

A modular jack is adapted for connecting a cable terminated with a plug to a circuit board. The jack includes a housing having a front face with a receptacle for receiving the plug, a rear face and a bottom face adapted for mounting on the circuit board. A light guide is provided on the housing and includes a front end at the front face of the housing and a remote end near the bottom face of the housing for guiding light from a source thereof on the circuit board to the front of the housing.

10 Claims, 3 Drawing Sheets

ELECTRICAL CONNECTOR WITH LIGHT TRANSMISSION MEANS

FIELD OF THE INVENTION

This invention generally relates to the art of electrical connectors and, particularly, to an electrical connector which has a built-in light transmission means for visual indication.

BACKGROUND OF THE INVENTION

Electrical connectors having built-in indicator lights have been known for some time. In these connectors, the indicator lights typically are located at the front of the connector. A typical connector may include an integral LED device to emit a light which indicates an operational function such as the reception or transmission of data or voice signals, verification of a good connection between separate pieces of equipment, indication when power is on or off, indication of a defect in a network transmission or any other state or condition in the equipment with which the connector is operatively associated.

Visual light indicating connectors are popular in modular jacks or similar types of connectors commonly used in telecommunications and data networking equipment. These jacks often are mounted on a circuit board to which they are to be connected. Problems have been encountered in incorporating such light indicating devices, such as LED devices, directly onto the connector due to the ever-increasing miniaturization of telecommunications and data networking equipment. There simply is not enough space to mount many LED devices directly on the connector housing. In addition, regardless of the size of the connector or jack, connectors which include light transmitting devices are expensive to manufacture and assembly for an otherwise relatively inexpensive component.

Also, integrating active visual indicators can introduce serious electromagnetic interference (EMI), due to the relatively high vertical distance of the associated indicator wiring from the PCB ground plane.

The present invention is directed to solving these problems by providing an electrical connector or modular jack which has light indicating capabilities without mounting the source of the light directly on the connector itself.

SUMMARY OF THE INVENTION

An object, therefore, of the invention is to provide a new and improved electrical connector capable of transmitting and indicating light for various visual indication purposes.

In the exemplary embodiment of the invention, a modular jack is adapted for connecting a cable terminated with a plug to a printed circuit board. The jack includes a housing having a front face with a receptacle for receiving the plug, a rear face and a bottom face adapted for mounting on the printed circuit board. A light guide means is provided on the housing and including a front end at the front face of the housing and a remote end near the bottom face of the housing for guiding light from a source thereof on the printed circuit board to the front of the modular jack.

As disclosed herein, the light guide means is provided by a one-piece, L-shaped light pipe independent of the housing. The L-shaped light pipe includes top and rear legs disposed in recessed areas in the outside of top and rear walls of the housing. The generally perpendicular legs of the L-shaped light pipe are joined at a juncture which includes an oblique reflecting surface. The light pipe is a homogeneous structure fabricated of such materials as a substantially clear polycarbonate material.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENTS

Figure 1:
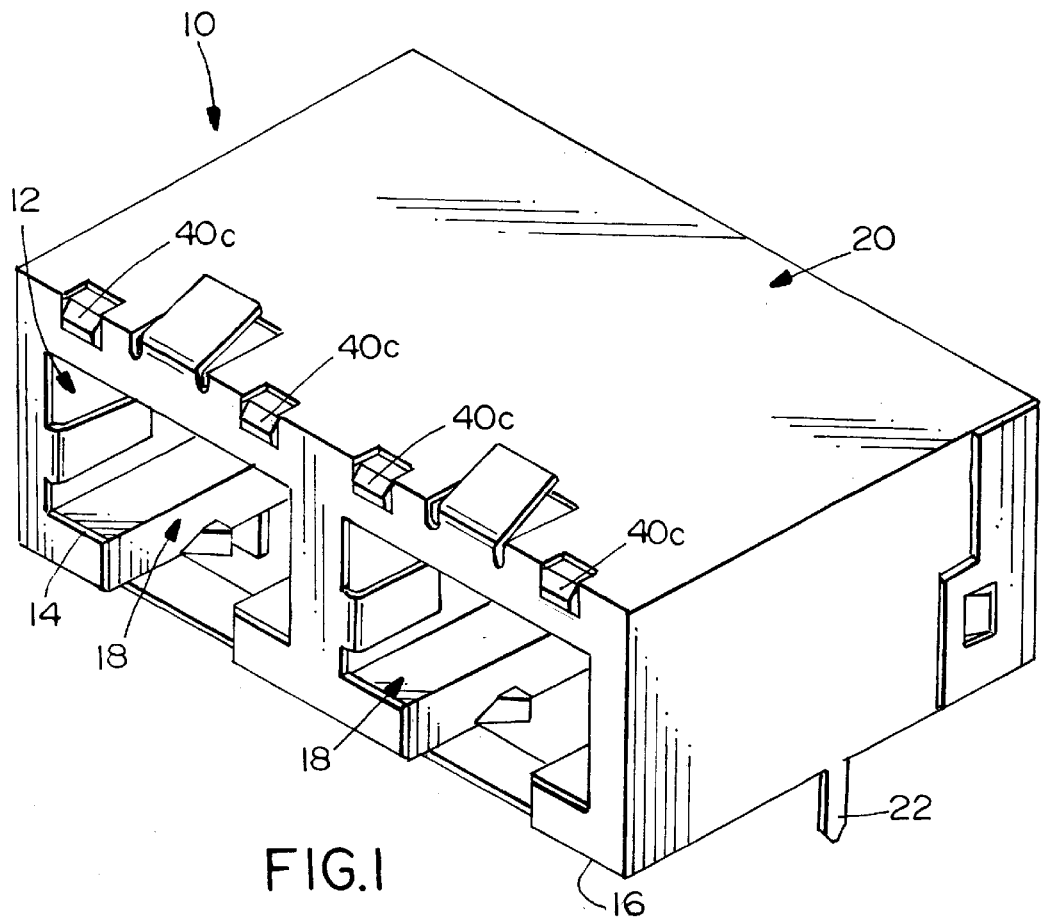
FIG. 1 is a perspective view of a dual-receptacle modular jack incorporating the concepts of the invention.

Referring to the drawings in greater detail, and first to FIG. 1, a dual-receptacle modular jack, generally designated 10, incorporates the concepts of the invention. The jack includes a dielectric housing, generally designated 12, which includes a front face 14 and a bottom face 16. A pair of plug-receiving receptacles, generally designated 18, open in front face 14, and the bottom face is adapted for mounting on a printed circuit board. Therefore, the modular jack is adapted for connecting a pair of cables terminated to a pair of plugs, received in receptacles 18, to the printed circuit board. Lastly, jack 10 includes a stamped and formed sheet metal shield, generally designated 20, substantially surrounding the top, sides and rear of housing 12. The shield has downwardly projecting feet 22 for insertion into appropriate holes in the printed circuit board and for solder connection to ground traces on the board and/or in the holes.

Figure 2:
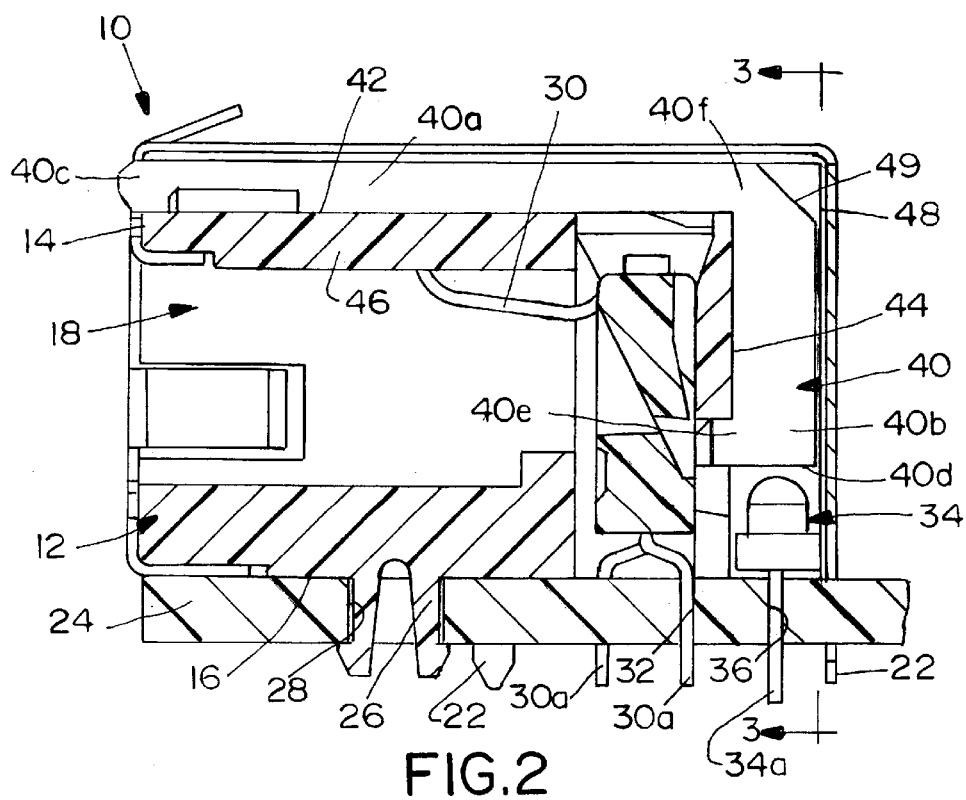
FIG. 2 is a front-to-rear vertical section through the modular jack at a location to best illustrate the configuration of one of the L-shaped light pipes, with the jack mounted on a printed circuit board.
Figure 3:
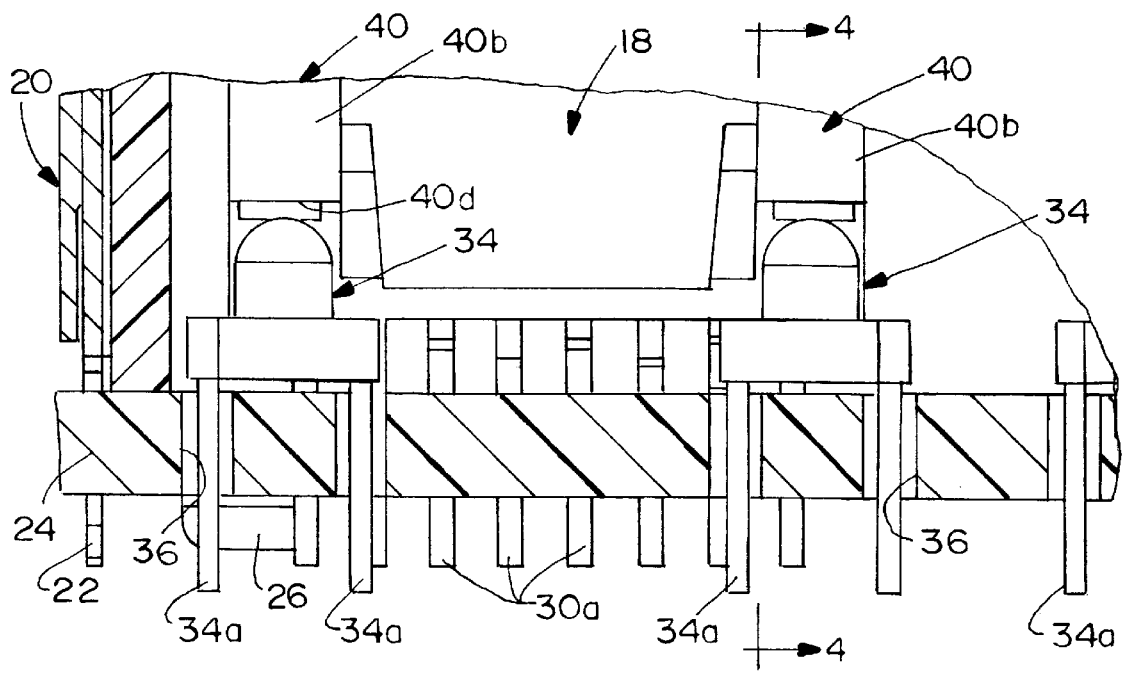
FIG. 3 is a fragmented vertical section taken generally along line 3—3 of FIG. 2.
Figure 4:
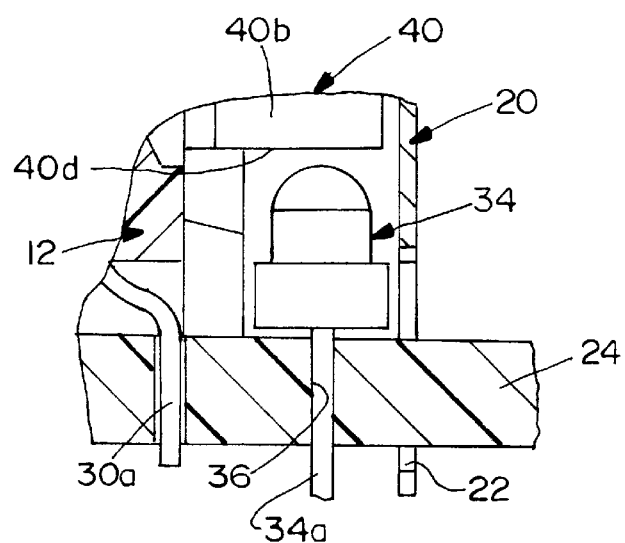
FIG. 4 is a fragmented section taken generally along line 4—4 of FIG. 3.

Referring to FIGS. 2–4 in conjunction with FIG. 1, it can be seen that housing 12 of modular jack 10 is adapted for mounting on a printed circuit board 24 by means of a pair of mounting posts 26 projecting from bottom face 16 of the housing and inserted into appropriate mounting holes 28 in the circuit board. Although only one mounting post 26 is visible in the drawings, two mounting posts are provided at opposite ends of housing 12 and connector 10. As is known, the connector also includes a plurality of contacts or terminals 30 (FIG. 2) projecting into each receptacle 18 for engaging a plurality of contacts on the plug which is inserted into the respective receptacle. The terminals have tail portions 30a extending below bottom face 16 of the housing and into appropriate holes 32 in the circuit board for solder connection to circuit traces on the board and/or in the holes.

Before proceeding with a further explanation of the details of modular jack 10, it should be pointed out that the modular jack does not include a light emitting device directly on the jack or connector as is prevalent in the prior art. In contrast, the system of the invention contemplates a light source, such as at least one LED, generally designated 34, mounted on circuit board 24. The LED includes a pair of terminals 34a which extend downwardly through appropriate holes 36 in the circuit board whereby the terminals can be solder connected to appropriate circuit traces on the board and/or in the holes. With modular jack 10 being precisely located on the circuit board by means of mounting posts 26, shield feet 22 and terminal tail portions 30a, precise mounting locations for LED's 34 can be determined prior to mounting the jack onto the board.

Turning back to the details of modular jack 10, the jack includes a light guide means in the form of a one-piece, L-shaped light pipe, generally designated 40. In dual-receptacle connector 10, there are two such light pipes for each plug receptacle 18. Each one-piece light pipe is independent of the connector housing 12 and is a homogeneous structure fabricated of such materials as a substantially clear polycarbonate material.

More particularly, each L-shaped light pipe 40 defines a top leg 40a and a rear leg 40b which are generally perpendicular to each other. The top leg terminates in a front end 40c of the light pipe which is located at front face 14 of the housing as best seen in FIG. 2. Rear leg 40b terminates in a remote end 40d of the light pipe near the bottom face of the housing. Actually, remote end 40d of the light pipe is located immediately above a respective one of the LED's 34. Top and rear legs 40a and 40b, respectively, of the light pipe are located in recessed areas 42 and 44, respectively, in the outside of top and rear walls 46 and 48, respectively, of housing 12. Therefore, the L-shaped light pipe is easily assembled to the housing by laying the pipe into the open recessed areas prior to assembling shield 20 to the housing. Rear leg 40b of the light pipe includes a shoulder 40e which locks to the housing to help hold the light pipe in position.

With front end 40c of light pipe 40 being located at front face 14 of the housing, and with remote end 40d of the light pipe being located immediately above a respective one of the LED's 34, the L-shaped light pipe is effective as a light guide means to direct the light from the remote location of the LED to the front of the modular jack. To this end, an oblique reflective surface 49 is formed on the light pipe at a juncture 40f between the generally perpendicular legs 40a and 40b of the light pipe to reflect or deflect the light rays from the bottom LED to the front of the jack. In essence, reflective surface 49 is at a 45° angle to both the axes of perpendicular legs 40a and 40b of the L-shaped light pipe.

Referring back to FIG. 1, it can be seen that there are four front ends 40c of four light pipes exposed at the front face of the modular jack, two for each plug-receiving receptacle 18 of the dual-receptacle jack. FIG. 3 shows two LED's 34 at opposite sides of one of the plug receiving receptacles 18 in alignment with two remote ends 40d of two light pipes. This exemplifies the advantages of the invention wherein the mounting of LED's or other light sources directly on the connector or jack is totally obviated. More than one indicator light often is used on a single connector. For instance, if indicator lights are used for purpose of testing circuits on a network or communications interface card on which the connector is installed, at least two such indicator lights are required, compounding the problem of lack of space on the connector for the lights and compounding the assembly and manufacturing costs involved in mounting the lights directly on the connector or jack itself.

Figure 5:
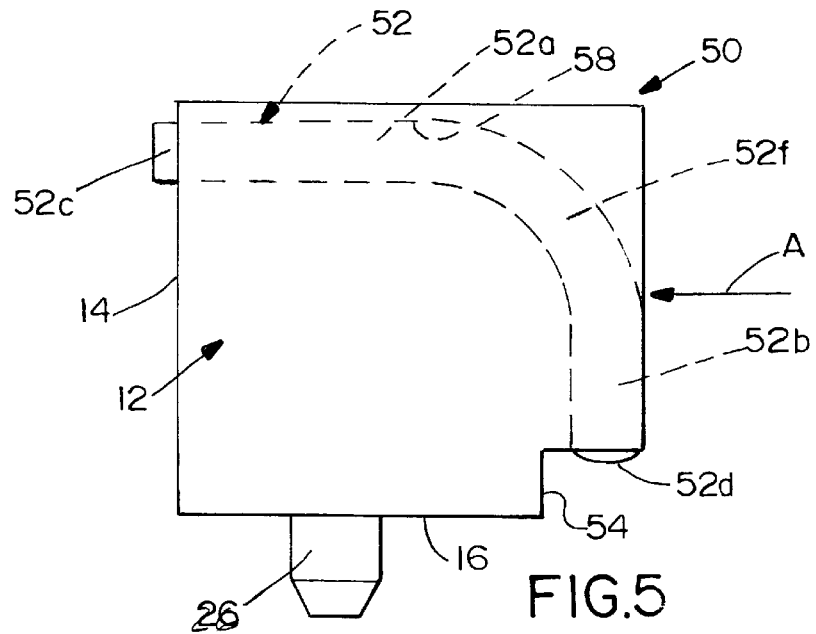
FIG. 5 is a side elevational view of a modular jack incorporating an alternate embodiment of light pipe.
Figure 6:
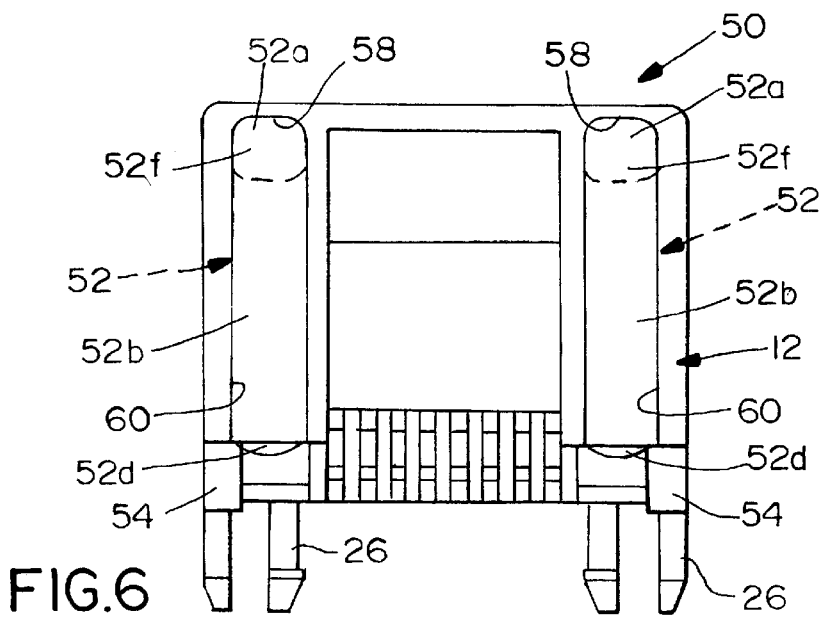
FIG. 6 is a rear elevational view of the modular jack of FIG. 5.
Figure 7:
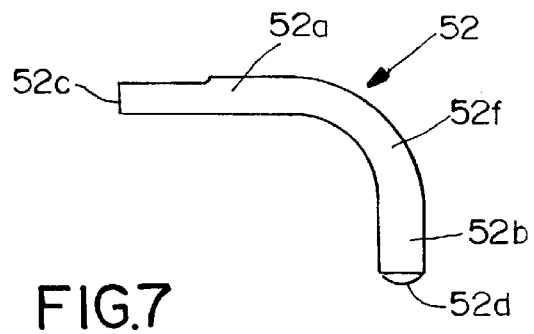
FIG. 7 is a side elevational view of one of the light pipes used in the embodiment of the modular jack shown in FIGS. 5 and 6.

FIGS. 5–7 show an alternate embodiment of the invention wherein generally L-shaped light pipes are used in a modular jack, generally designated 50, which includes only a single receptacle 18 opening at a front face 14 of the jack housing 12. Again, the housing includes a pair of mounting posts 26 for mounting the jack onto a circuit board. Again, jack 50 incorporates a pair of generally L-shaped light pipes, generally designated 52, defining a top leg 52a and a rear leg 52b, with the top leg defining a front end 52c of the light pipe at front face 14 of the jack, and with rear leg 52b defining a remote end 52d of the light pipe near the bottom face 16 of the jack. The jack and its housing is recessed, as at 54, to accommodate LED's mounted on the printed circuit board separate from the jack.

FIG. 7 shows one of the light pipes 52 removed from jack 50 for purposes of illustration. Whereas light pipe 40 in the embodiment of FIGS. 2–4 has generally perpendicular legs joined at a right-angled juncture 40f, requiring the use of oblique reflecting surface 49, legs 52a and 52b of light pipe 52 are joined by a gradually curved juncture 52f. With the light pipe being fabricated of a homogeneous structure, such as of substantially clear polycarbonate material, the outside surfaces of the light pipe around gradual curved juncture 52f are effective to gradually guide the light rays through the juncture from remote end 52d of the light pipe to front end 52c of the light pipe. Therefore, the gradually curved, L-shaped light pipe 52 is effective as a light guide means for directing light from the remote LED to the front face of the connector.

In the embodiment of FIGS. 5–7, the L-shaped light pipes 52 are mounted in jack 50 from the rear of housing 12. Specifically, top legs 52a are inserted into cored-out passages 58 in the housing in the direction of arrow "A" (FIG. 5). When the light pipes are fully inserted, rear legs 52b seat in open vertical recesses 60 at the rear of the housing.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:
1. A modular jack for connecting a cable terminated with a plug to a circuit board, comprising:
 a housing having a front face with a receptacle for receiving the plug, a rear face and a bottom face adapted for mounting on the circuit board;
 a light guide means on an outside of top and rear walls of the housing and including a front end at the front face of the housing and a remote end near the bottom face of the housing for guiding light from a source thereof on the circuit board to the front of the modular Jack;
 wherein said light guide means comprises a one-piece, L-shaped light pipe independent of the housing; and
 wherein said L-shaped light pipe includes top and rear legs disposed in recessed areas on the outside of the top and rear walls of the housing.

2. The modular jack of claim 1 wherein said L-shaped light pipe includes generally perpendicular legs joined at a juncture which includes an oblique reflecting surface.

3. The modular jack of claim 1 wherein said light pipe is a homogeneous structure fabricated of substantially clear polycarbonate material.

4. An electrical connector for mounting on a circuit board, comprising:

a housing having a bottom face adapted for mounting on the circuit board and a second face remote from the bottom face;

a light guide means on an outside wall of the housing and including a first end near the bottom face of the housing and a second end at the second face of the housing for guiding light from a source thereof on the circuit board to the second face of the housing; and wherein said light guide means comprises a one-piece light pipe independent of the housing, and wherein said light pipe is generally L-shaped defining generally perpendicular legs joined at a juncture which includes an oblique reflecting surface.

5. The connector of claim 4 wherein said light pipe is disposed in a recessed area on the outside wall of the housing.

6. The connector of claim 4 wherein said light pipe is a homogeneous structure fabricated of substantially clear polycarbonate material.

7. A system for providing visual indication of an electrical condition of an electrical connector mounted on a circuit board, comprising:

a circuit board having a light source mounted thereon;

a housing having a bottom face adapted for mounting on the circuit board adjacent said light source and a second face remote from the bottom face;

a light guide means on an outside wall of the housing and including a first end adjacent the light source and a second end at the second face of the housing for guiding light from the light source on the circuit board to the second face of the housing; and wherein said light guide means comprises a one-piece light pipe independent of the housing, and wherein said light pipe is generally L-shaped defining generally perpendicular legs joined at a juncture which includes an oblique reflecting surface.

8. The system of claim 7 wherein said light pipe is disposed in a recessed area on the outside wall of the housing.

9. The system of claim 7 wherein said light pipe is a homogeneous structure fabricated of substantially clear polycarbonate material.

10. The system of claim 7 wherein said light source comprises an LED device.

\* \* \* \* \*